July 16, 1946.
H. B. SCHULTZ
2,404,102
REGULATING VALVE
Filed Dec. 12, 1942
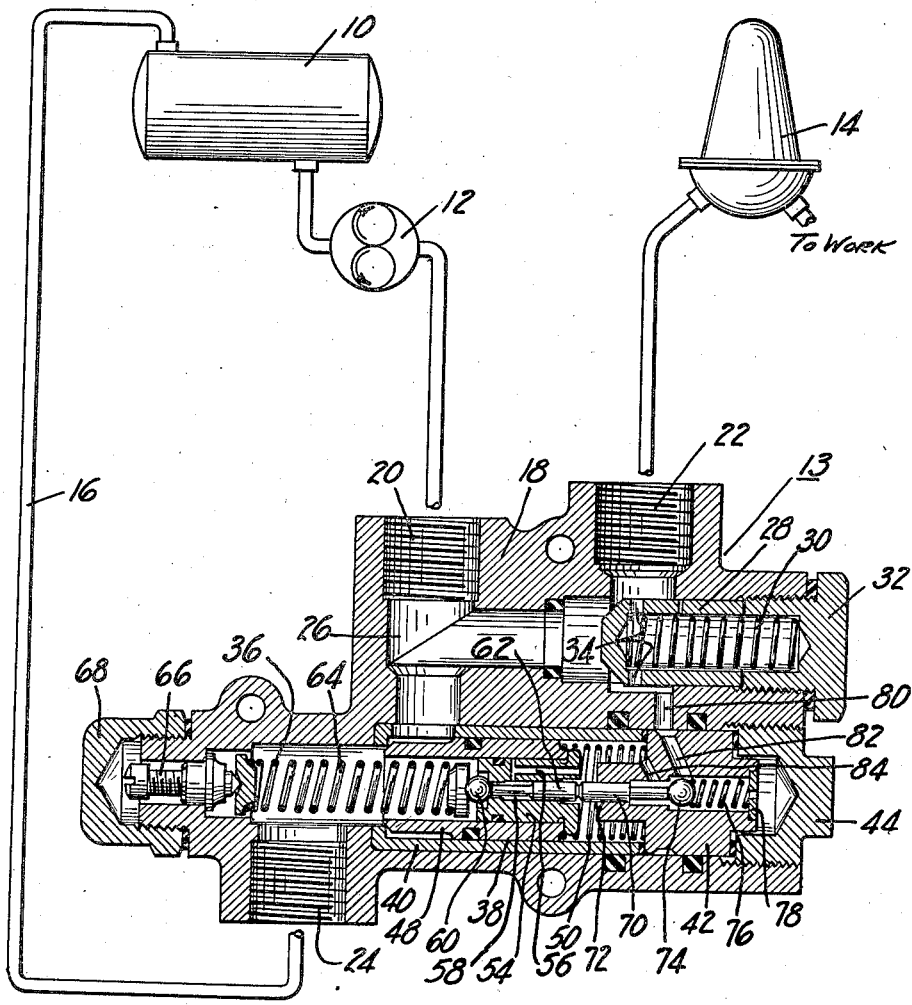
INVENTOR
HAROLD B. SCHULTZ
BY
A. R. McCrady Patented July 16, 1946

2,404,102

UNITED STATES PATENT OFFICE 2,404,102

REGULATING VALVE

Harold B. Schultz, South Bend, Ind., assignor to Bendix Aviation Corporation, South Bend, Ind., a corporation of Delaware Application December 12, 1942, Serial No. 468,763

6 Claims. (Cl. 137—153)

This invention relates generally to fluid pressure systems for aircraft, and particularly to improvements in regulating or unloading valves designed to maintain a close range of pressures in such systems.

Fluid pressure systems for aircraft generally employ a pump, which is connected by a power takeoff from the engine, for placing fluid under pressure which is stored in an accumulator. Since it is ordinarily not practicable to disconnect the pump from the engine when the desired upper limit of pressure in the accumulator is reached, it is the practice to employ a valve in such a system which will operate to unload pumped fluid back into a reservoir. Such valves are also operable to prevent unloading back to reservoir when the pressure in the accumulator has fallen to some selected value, at which time the pump will pass fluid to the accumulator until the upper pressure limit is reached once more.

The valves of the prior art have generally been open to the objection that they will not operate at the desired pressure limits, i. e., they do not start the loading operation consistently at the low pressure limit, nor do they start the unloading operation consistently at high pressure limit. If the operating range of such valves cannot be closely held, it is obvious that such systems will not be operated at optimum.

Another objection open to the valves of the prior art lies in the fact that they are not adjustable for pressure systems which are desired to be held at different pressure values. No definite standard having been set in the industry for the pressures to be employed in such systems, it is necessary to design each valve according to the pressure valves used, and it therefore is impossible to use the valves interchangeably with systems using different pressure values.

It is therefore an object of this invention to provide a regulator or unloading valve for such a fluid pressure system which will be operable at the desired limits of pressure.

Another object is to provide a valve of the type mentioned which is adjustable, so that it will open at any desired predetermined high pressure, and so that it can be made interchangeable in pressure systems employing different pressure values.

Yet another object is to provide such a valve, which when in the open position, will have very little resistance to fluid flow, so that the head against which the pump must operate during the unloading period is kept to a minimum.

A still further object is to provide a valve which will not require close concentricity to be maintained in the working parts thereof, thereby decreasing the cost of manufacture.

A still further object is to provide a regulator or unloading valve which will have incorporated therein means for preventing the flow of fluid in a reverse direction through the valve.

Another object is to provide a novel valve construction which requires only a single casting to serve as the valve body, and which will require a minimum of wear resistant liners in the body thereof.

Other desirable advantages and functions of the regulator or unloading valve comprising this invention will be apparent from a study of the specification and drawing in which the single figure shows a fluid pressure system having therein the valve according to the present invention shown in longitudinal section.

Referring now to the drawing, the fluid pressure system shown comprises a reservoir 10, a pump 12 connected through a regulator valve 13 to an accumulator 14 which is maintained at a desired pressure value by means of the valve 13, the operation of which will be described later. The accumulator 14 may be connected to work as shown, and the regulator valve 13 is connected back to the reservoir 10 by means of a conduit 16.

The regulator or unloading valve 13 comprises a body 18 having a pumping or inlet port 20 connected to the pump 12, a working port 22 connected to the accumulator 14, and a relief or reservoir port 24 connected to the conduit 16 which in turn passes fluid back to the reservoir 10 under conditions which will be later described.

For passing pumped fluid from pumping port 20 to the working or accumulator port 22 a passage 26 is provided which has within it, at the intersection of the working port 22 and the passage 26, a check valve 28, which prevents the return of fluid from the accumulator port 22 to the pump 12. Check valve 28 is constantly urged to the left by a coil spring 30 which abuts a cap screw 32 threaded into the body 18, and is provided with relief ports 34 to equalize with the accumulator any pressure behind it.

A bore 36 intersects the relief port 24 and the pumping port 20, and is enlarged as at 38 to provide for a wear resistant liner 40, which is held in position by a hollow seat member 42 and a threaded plug 44.

For preventing the flow of pumped fluid to the reservoir 10 a movable plunger 48 is provided within the liner 40 and is normally biased to the left by a spring 50 which abuts the hollow seat member 42. Means are provided for the control of the movements of the plunger 48 as regards its position for unloading fluid to the reservoir or its position for loading pumped fluid into the accumulator 22, and includes a member 54 adapted for movement with respect to the hollow plunger 48. Member 54 has a passage 56 therein, which communicates with a bore 58, upon which ball valve 60 is adapted to seat, and which communicates with the chamber formed behind the hollow plunger 48, the member 54, and the hollow seat member 42. A piston member 62 slides in the bore 58 and contacts the ball 60. A load is maintained on ball 60 and its seat by means of the spring 64 which may be load adjusted by means of the adjusting screw 66 which is enclosed by an acorn nut 68 threaded to the body 18.

Adapted to contact the piston member 62 is a second piston member 70 which is slidable in a bore 72 in the hollow seat member 42, and which contacts a second ball valve 74, whose seat is larger in effective area than the seat of ball valve 60. Ball valve 74 at times may be seated, and is at all times urged to the left by a spring 76 which abuts a keeper 78 which is staked into position in the hollow seat member 42. A passage 80 in the valve body 18, and a passage 82 in the hollow seat member 42 serves to transmit the pressure at the working port 22 to the seat for the ball 74, and the pressure can at times be communicated to the chamber behind the hollow plunger 48 into passages 56 and 58 by means of a passage 84.

The operation of the valve just described is as follows:

Assuming no residual pressure in the system, the position of the parts shown will be such that the hollow plunger 48 will be seated as shown in the figure, since it is urged to the left by the spring 50; and the member 54 will be urged to the right to a position where it abuts the hollow seat member 42, since member 54 is urged to the right by the load maintained in the spring 64 against the ball 60. When the pump 12 begins to pass fluid under pressure to the accumulator 14, a part of the fluid is passed through the passages 80, 82, 84 and into the chamber formed behind the hollow plunger 48 into the passages 56 and 58 and the fluid also impinges against ball 60, which is seated on member 54. The pressure continues to build up until the member 54 has moved to the position as shown in the single figure, and will remain in that position until the upper desired limit of pressure in the accumulator 14 is attained.

When the upper limit of pressure is reached the force against the seat of ball valve 60 is sufficient to unseat it against the force of spring 64. As the ball valve 60 unseats, the pressure behind it is relieved, and as the pressure cannot be admitted readily through the restricted passage 56, the pressure acting on the right hand end of piston member 70 through the passages 80 and 82 further unseats the ball 60 until the ball 74, which is urged to the left by spring 76 is seated in the seat member 42. When the ball 74 is seated the load in spring 64 is opposed by the hydraulic force against the seat of ball valve 74 and ball 60 is thus held from its seat. Once the ball 74 is seated the pressure behind the plunger 48 and the member 54 is relieved through the passages 56 and 58 and the plunger 48 with the member 54 moves to the right with this relief of pressure against the hollow seat member 42, thereby permitting fluid to pass from the pump 12, through the pumping port 20, out the relief port 24 and into the reservoir 10.

When the demand for fluid on the accumulator 14 causes the pressure within it to drop the valve will travel to closed position as shown in the figure, so that fluid under pressure can be passed from the pump 12 to the accumulator 14 until the desired upper limit of pressure is once more attained. The sequence of operations taking place in the valve 12 under such conditions is as follows:

When the pressure in the accumulator 14 drops, as has been explained, the spring 64 tends to overcome the force on first the seat of ball 74 and then the smaller area of the piston member 70, and the ball valve 60 will then close. With the ball valve 74 open, fluid is free to pass from the pumping port 20 through the passages 80, 82, and 84 into the chamber behind the hollow valve plunger 48 and the member 54. A pressure differential is thus created across the plunger 48 and it will then seat as shown in the figure.

While the valve has been described with reference to a particular set of operating conditions, which includes operation below the upper limit of pressure at which the valve unloads pumped fluid back to the reservoir, and an operating range as determined by the ball valves 60 and 74, it will be apparent that the point at which unloading may begin and the range during which the unloading operation obtains may easily be adjusted to for any desired set of operating conditions. For example, to cause the valve to unload at a higher pressure value, it is only necessary to increase the load in spring 64 by means of the adjusting screw 66. To increase the range in which the unloading operation takes place it is only necessary to increase the area of the seat of ball valve 74 with respect to the area of the seat of ball valve 60. Conversely, it will only be necessary to decrease the area of the seat of ball valve 60 with respect to the area of the seat of ball valve 74 to increase the range. Obviously the increased or decreased difference in seat areas may be obtained by the selection of members 54 and 42, which have with them seat areas according the particular range of desired pressures. Obviously the effective area of piston member 70 must be between the area of the two ball valve seats.

It will also be obvious that the valve described has a minimum number of parts which require concentricity to be held very closely to insure close fits for minimizing leakage through the valve. Thus to prevent the leaking of pumped fluid through the valve into the reservoir, only the plunger 48 must be held concentric with its seat, the ball valves 60 and 74 being adapted to seat readily regardless of the alignment of springs 64 and 76 and the piston members 62 and 70. The only other member required to be held closely concentrically is the check valve 28, and the importance of close concentricity in the check valve 28 is not relatively great.

While the invention has been described with reference to a preferable embodiment thereof, it is not to be limited in any wise by the embodiment shown, nor otherwise than by the terms of the appended claims.

I claim:

1. A regulator valve which opens at an upper limit to relieve pressure from a fluid pressure system and which is closed at a lower limit comprising a body having pumping, working and relief ports, means establishing communication between the pumping and working ports, a bore intersecting the relief port and having a valve seat disposed therein, means including said bore and valve seat for establishing communication between said pumping and relief ports, a pressure responsive normally spring-closed plunger movable in said bore and constructed and arranged to cooperate with said valve seat for closing the relief port, said plunger being so constituted that its end adjacent the valve seat is subjected to the pressure at the pumping port and its other end is subjected to a variable pressure, control means for regulating said variable pressure comprising a member movable with respect to the plunger and having a restricted passage therethrough for dissipating fluid from said other end of said plunger and a first control valve seat thereon, a first control valve biased to said seat, conduit means establishing communication between the working port and said other end of the plunger, said conduit means being provided with a second control valve seat, a second control valve biased toward the second control valve seat, the first control valve seat being of smaller cross-sectional area than the second control valve seat, means intermediate and in contact with both said control valves arranged so that but one of said control valves may be seated at a time, the bias for the first control valve exceeding that of the second control valve, the first control valve and intermediate means being arranged so that said first control valve will become at least slightly unseated when the pressure transmitted from said working port exceeds said upper limit to create a differential in pressure on said intermediate means causing it to completely unseat said first control valve and permit the seating of said second control valve, the unseating of said control valve being effective to dissipate sufficient pressure from said other end of the plunger to cause it to move to pass fluid from the pumping port to the relief port.

2. A regulator valve which opens at an upper limit to relieve pressure from a fluid pressure system and which is closed at a lower limit comprising a body having pumping, working and relief ports, means establishing communication between the pumping and working ports, a bore intersecting the relief port and having a valve seat disposed therein, means including said bore and valve seat for establishing communication between said pumping and relief ports, a pressure responsive normally spring-closed plunger movable in said bore and constructed and arranged to cooperate with said valve seat for closing the relief port, said plunger being so constituted that its end adjacent the valve seat is subjected to the pressure at the pumping port and its other end is subjected to a variable pressure, control means for regulating said variable pressure comprising a member movable with respect to the plunger and having a restricted passage therethrough for dissipating fluid from said other end of said plunger and a first control valve seat thereon, a first control valve biased toward said seat and normally seated thereon, the first control valve seat being of smaller cross-sectional area than the second control valve seat, conduit means establishing communication between the working port and said other end of the plunger, said conduit means being provided with a second control valve seat, a second control valve biased toward the second control valve seat and normally unseated therefrom, means intermediate the first and second control valves and arranged for unseating the second control valve when the first control valve is seated and vice versa, the first control valve being arranged so that it will become unseated when the pressure transmitted from said working port exceeds said upper limit, the arrangement being such that sufficient movement of the second control valve toward its seat creates a differential in pressure on said second control valve causing it to move towards its seat to further unseat said first control valve and to seat said second control valve, the unseating of said first control valve being effective to dissipate sufficient pressure from said other end of the plunger to cause it to move to pass fluid from the pumping port to the relief port.

3. A regulator valve which opens at an upper limit to relieve pressure from a fluid pressure system and which is closed at a lower limit comprising a body having pumping, working and relief ports, means establishing communication between the pumping and working ports, a bore intersecting the relief port and having a valve seat disposed therein, means including said bore and valve seat for establishing communication between said pumping and relief ports, a pressure responsive normally spring-closed plunger movable in said bore and constructed and arranged to cooperate with said valve seat for closing the relief port, said plunger being so constituted that its end adjacent the valve seat is subjected to the pressure at the pumping port and its other end is subjected to a variable pressure, control means for regulating said variable pressure comprising a member movable with respect to the plunger and having a restricted passage therethrough for dissipating fluid from said other end of said plunger and a first control valve seat thereon, a first control valve spring biased to said seat, conduit means establishing communication between the working port and said other end of the plunger, said conduit means being provided with a second control valve seat, a second control valve spring biased toward the second control valve seat, the first control valve seat being of smaller cross-sectional area than the second control valve seat, means including a plurality of piston members coaxially arranged with respect to each other and disposed intermediately and in contact with both said control valves arranged so that but one of said control valves may be seated at a time, the bias for the first control valve exceeding that of the second control valve, the first control valve and intermediate means being arranged so that said first control valve will be at least slightly unseated when the pressure transmitted from said working port exceeds said upper limit to create a differential in pressure on said intermediate means causing it to completely unseat said first control valve and permit the seating of said second control valve, the unseating of said control valve being effective to dissipate sufficient pressure from said other end of the plunger to cause it to move to pass fluid from the pumping port to the relief port.

4. A regulator valve for a fluid pressure system comprising a body having an inlet, working and relief ports, means establishing communication between the inlet and working ports, a conduit interconnecting the inlet and relief ports, a plunger disposed in the conduit constructed and arranged to control communication between the inlet and relief ports, said plunger being normally spring biased to cut off communication between the inlet and relief ports and so constituted to respond to the inlet port pressure acting on one end for moving said plunger in a direction to establish communication between the inlet and relief ports and to respond to working port pressure acting on the other end for moving said plunger in a direction to cut off communication between said inlet and relief ports, means for controlling the working port pressure acting on said other end of the plunger comprising a first valve carried by the plunger and normally spring seated, a passageway communicating the first valve and said other end of the plunger with the working port pressure, a second valve in said passageway urged toward its seat and normally unseated to permit the working port pressure to act on said other end of the plunger and on said first valve, the first valve seat being of smaller cross-sectional area than the second valve seat, means disposed between the valves and so arranged that one only of said valves is seated at a time, the force seating the first valve being greater than the force urging the second valve toward its seat, said first valve being arranged to unseat in response to the working port pressure above a predetermined value, the arrangement being such that sufficient movement of the second control valve toward its seat creates a differential in pressure on said second valve to seat it in said passageway, the unseating of said first valve being effective to dissipate the working port pressure acting on said other end of the plunger to cause it to move to establish communication between the inlet port and relief port.

5. A regulator valve for a fluid pressure system comprising a body having inlet, working and relief ports, means establishing communication between the inlet and working ports, a conduit interconnecting the inlet and relief ports, a plunger disposed in the conduit constructed and arranged to control communication between the inlet and relief ports, said plunger being normally spring biased to cut off communication between the inlet and relief ports and so constituted to respond to inlet port pressure acting on one end for moving said plunger in a direction to establish communication between the inlet and relief ports and to respond to working port pressure acting on the other end for moving said plunger in a direction to cut off communication between said inlet and relief ports, means for controlling the working port pressure acting on said other end of the plunger comprising a member slidable in said plunger and having a flanged end for engaging the plunger to urge the same in a direction to cut off communication between the inlet and relief ports, a first valve in the slidable member normally spring seated, a passageway communicating the flanged end of the member, the first valve and the said other end of the plunger with the working port pressure, a second valve in said passageway urged toward its seat and arranged to be normally unseated, the first valve seat being of smaller cross-sectional area than the second valve seat, a pair of piston members coaxially arranged intermediate the first and second valves and constructed and arranged so that one only of said valves is seated at a time, the force seating the first valve being greater than the force urging the second valve toward its seat, said first valve being arranged to unseat in response to the working port pressure above a predetermined value, the arrangement being such that sufficient movement of the second control valve toward its seat creates a differential in pressure on said second valve to seat it in said passageway, the unseating of said first valve being effective to dissipate the working port pressure acting on said member and said other end of the plunger to cause them to move in a direction to establish communication between the inlet and relief ports.

6. A regulator valve for a fluid pressure system comprising a body having inlet, working and relief ports, means establishing communication between the inlet and working ports, a conduit interconnecting the inlet and relief ports, a plunger disposed in the conduit and constructed and arranged to control communication between the inlet and relief ports, said plunger being so constituted that one of its ends is subject to inlet pressure tending to move the plunger to establish communication between the inlet port and relief port and its other end is subject to working port pressure tending to move the plunger to cut off communication between the inlet port and relief port, means for regulating said working port pressure acting on said other end of the plunger and comprising a first valve carried by the plunger and normally spring seated, a passageway establishing communication between the first valve and said other end of the plunger with the working port, a second valve in said passageway urged toward its seat and normally unseated, means disposed between the valves and so arranged that one only of said valves is seated at a time, the force seating the first valve being greater than the force urging the second valve toward its seat, said first valve being arranged to unseat in response to the working port pressure above a predetermined value, the arrangement being such that sufficient movement of the second control valve toward its seat creates a differential in pressure on said second valve to seat it in said passageway, the unseating of said first valve being effective to dissipate the working port pressure acting on said other end of the plunger to cause it to move to establish communication between the inlet port and relief port, said second valve being constructed and arranged to unseat in response to working port pressure at a value less than said predetermined value to permit said first valve to seat, whereby the working port pressure is communicated to said other end of the plunger to cause it to move to cut off communication between the inlet port and relief port.

HAROLD B. SCHULTZ.

Certificate of Correction

Patent No. 2,404,102.

July 16, 1946.

HAROLD B. SCHULTZ

It is hereby certified that error appears in the printed specification of the above numbered patent requiring correction as follows: Column 5, lines 68, 69, and 70, claim 2, strike out the words and comma "the first control valve seat being of smaller cross-sectional area than the second control valve seat," and insert the same after the comma and before "means" in column 6, line 1; and that the said Letters Patent should be read with this correction therein that the same may conform to the record of the case in the Patent Office.

Signed and sealed this 2nd day of September, A. D. 1947.

[SEAL]

LESLIE FRAZER,
*First Assistant Commissioner of Patents.*